(12) United States Patent
Shi

(10) Patent No.: US 10,802,581 B2
(45) Date of Patent: Oct. 13, 2020

(54) EYE-TRACKING-BASED METHODS AND SYSTEMS OF MANAGING MULTI-SCREEN VIEW ON A SINGLE DISPLAY SCREEN

(71) Applicant: Huizhou TCL Mobile Communication Co., Ltd, Huizhou, Guangdong (CN)

(72) Inventor: Zhen Shi, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 306 days.

(21) Appl. No.: 15/117,891

(22) PCT Filed: Oct. 9, 2015

(86) PCT No.: PCT/CN2015/091524
§ 371 (c)(1),
(2) Date: Aug. 10, 2016

(87) PCT Pub. No.: WO2016/176959
PCT Pub. Date: Nov. 10, 2016

(65) Prior Publication Data
US 2017/0160799 A1    Jun. 8, 2017

(30) Foreign Application Priority Data

May 4, 2015  (CN) .......................... 2015 1 0219997

(51) Int. Cl.
*G06F 3/01* (2006.01)
*G06F 3/0484* (2013.01)
*G06F 3/0481* (2013.01)

(52) U.S. Cl.
CPC ............ *G06F 3/013* (2013.01); *G06F 3/0481* (2013.01); *G06F 3/0484* (2013.01); *G06F 2203/04803* (2013.01)

(58) Field of Classification Search
CPC ...... G06F 3/013; G06F 3/0481; G06F 3/0484; G06F 2203/04803; G06T 7/20
(Continued)

(56) References Cited

U.S. PATENT DOCUMENTS 9,007,301 B1    4/2015  Raffle et al.
9,823,756 B2 *  11/2017  Kwak .................. G06F 3/0346
(Continued)

FOREIGN PATENT DOCUMENTS

CN    101813976 A    8/2010
CN    101866215 B  * 10/2013
(Continued)

OTHER PUBLICATIONS

15117891 European Search Opinion—EP15877369 (dated 2018).*

*Primary Examiner* — Sherief Badawi
*Assistant Examiner* — Koorosh Nehchiri
(74) *Attorney, Agent, or Firm* — Cheng-Ju Chiang

(57) ABSTRACT

An eye-tracking-based method and system of managing multi-screen view on a single display screen are disclosed. The method includes: when the display screen of a mobile terminal is under the multi-screen mode, determining the user's current eye gaze coordinates on the display screen using eye-tracking technology; determining whether a duration the user's gaze point stays within a specified range about the current gaze coordinates exceeds a preset gaze threshold, if exceeds, analyzing the user's eye movement information using the eye-tracking technology; when the eye movement information denotes an open-eye state, then determining whether the duration the gaze point stays within the specified range about the current gaze coordinates exceeds a preset full-screen threshold, if exceeds, display in full screen the split screen where the current gaze coordinates are located. Thus, the eye-tracking technology can be
(Continued)

used to obtain the current gaze coordinates and the corresponding gaze duration and the eye movement information, and determinations can then be made whether to make the split screen of interest full-screen or to exit the full-screen view, providing convenience to the user.

19 Claims, 2 Drawing Sheets

(58) Field of Classification Search
USPC .......................................................... 715/763
See application file for complete search history.

(56) References Cited

U.S. PATENT DOCUMENTS

| | | | | |
|---|---|---|---|---|
| 2009/0315869 | A1* | 12/2009 | Sugihara | G06F 1/1605 345/204 |
| 2012/0169582 | A1* | 7/2012 | Tschirhart | G02B 27/01 345/156 |
| 2012/0242570 | A1* | 9/2012 | Kobayashi | G06F 3/017 345/156 |
| 2012/0280899 | A1* | 11/2012 | Huhtala | G06F 3/013 345/156 |
| 2012/0300061 | A1* | 11/2012 | Osman | G06F 1/3231 348/135 |
| 2013/0097557 | A1* | 4/2013 | Madau | A61B 5/18 715/810 |
| 2013/0231937 | A1 | 9/2013 | Woodall et al. | |
| 2013/0307771 | A1* | 11/2013 | Parker | G06F 3/013 345/158 |
| 2013/0321265 | A1* | 12/2013 | Bychkov | G06F 3/013 345/156 |
| 2013/0321270 | A1* | 12/2013 | Bjorklund | G06F 3/013 345/158 |
| 2014/0129987 | A1* | 5/2014 | Feit | G06F 3/04842 715/835 |
| 2014/0232639 | A1* | 8/2014 | Hayashi | G06F 3/013 345/156 |
| 2015/0029096 | A1* | 1/2015 | Ishihara | H04N 5/63 345/156 |
| 2015/0199559 | A1* | 7/2015 | Sztuk | H04N 5/23219 348/78 |
| 2015/0220157 | A1* | 8/2015 | Marggraff | G06F 3/017 345/156 |
| 2015/0234457 | A1* | 8/2015 | Kempinski | G06F 3/013 345/156 |
| 2016/0185220 | A1* | 6/2016 | Mere | B60K 37/06 340/438 |
| 2016/0225012 | A1* | 8/2016 | Ha | G06Q 30/0242 |

FOREIGN PATENT DOCUMENTS

| | | |
|---|---|---|
| CN | 103593051 A | 2/2014 |
| CN | 103645806 A | 3/2014 |
| CN | 103853330 A | 6/2014 |
| CN | 104571528 A | 4/2015 |
| CN | 104834446 A | 8/2015 |
| WO | WO2014019307 A1 | 2/2014 |
| WO | WO 2014019307 A1 | 2/2014 |

* cited by examiner

EYE-TRACKING-BASED METHODS AND SYSTEMS OF MANAGING MULTI-SCREEN VIEW ON A SINGLE DISPLAY SCREEN

FIELD OF THE DISCLOSURE

The present disclosure relates to eye-tracking technology, and more particularly, to eye-tracking-based methods and systems of managing multi-screen view on a single display screen.

BACKGROUND OF THE DISCLOSURE

Split-screen technology has gained various types of sophisticated implementations that have been widely used in all kinds of display terminals, including mobile terminals (such as mobile phones, pads), televisions, personal computers, etc.

Typically, the split-screen mode can allow a mobile terminal to simultaneously run and display two applications on a single screen. It is worth mentioning that Google® has included the split-screen mode as an off-the-shelf feature of the next-generation Android® system. The iOS® 8 has already enabled the split-screen function on iPad®, in which two simultaneously running applications can interact and share contents with each other, for example, the text, video, images shown on one application can be dragged to the other. Hence the split-screen functionality eliminates the need of having to switch back and forth among multiple tasks, making it easier for users to handle multiple tasks simultaneously. However, when the user needs to switch between different screens or maximize the screen of interest, touches or slides will be required, which may cause inconvenience to the user and thus cannot meet his increasing requirements.

Hence the prior art has yet to be improved and developed.

SUMMARY OF THE DISCLOSURE

In view of the above-mentioned deficiencies of the prior art, one objective of the present disclosure is to provide an eye-tracking-based method and system of managing multi-screen view on a single display screen, to remedy the drawback of the prior art that the user is required to perform touching or sliding operations in order to switch between different screens or to maximize the current screen of interest.

One technical solution adopted by the disclosure is as follows.

An eye-tracking-based method of managing multi-screen view on a single display screen may comprise the following steps of:
A, when a display screen of a mobile terminal is under the multi-screen mode, determining the user's current eye gaze coordinates on the display screen by capturing eye images in real time and employing eye-tracking technology;
B, determining whether a duration the user's gaze point stays within a specified range about the current gaze coordinates exceeds a preset gaze threshold, if exceeds, analyzing the eye movement information using the eye-tracking technology;
C, if the eye movement information denotes an open-eye state, then determining whether the duration the gaze point stays within the specified range about the current gaze coordinates exceeds a preset full-screen threshold, if exceeds, displaying in full screen the split screen where the current gaze coordinates are located; after having entered the full-screen view, determining the user's current eye gaze coordinates on the display screen using eye-tracking technology, if determining the user's current eye gaze coordinates are found within a specified area of the display screen and the duration the gaze point stays within a specified range about the current gaze coordinates exceeds the preset gaze threshold, exiting the full-screen view and restoring to the multi-screen mode; and
D, if the eye movement information denotes a closed-eye state, then closing the split screen where the current gaze coordinates are located.

In the above method the step B may comprise specifically:
B1, determining whether the user's current eye gaze coordinates are located within a multi-screen region or a split-screen templates region in the display screen;
B2, if the current gaze coordinates are located within the multi-screen region, then further determining whether the duration the gaze point stays within the specified range about the current gaze coordinates exceeds the preset gaze threshold, if yes, analyzing the eye movement information using the eye-tracking technology; and
B3, if the current gaze coordinates are located within the split-screen templates region, then further determining whether the duration the gaze point stays within a specified range about the current gaze coordinates exceeds the preset gaze threshold, if yes, entering a preset split-screen templates selecting and managing interface.

The preset gaze threshold may lie in a range of 5-10 seconds.

The display screen of the mobile terminal may comprise 4 split screens under the multi-screen mode.

According to another aspect of the disclosure, an eye-tracking-based method of managing multi-screen view on a single display screen is further disclosed, the eye-tracking-based method may comprise the following steps of:
A, when a display screen of a mobile terminal is under the multi-screen mode, determining the user's current eye gaze coordinates on the display screen by capturing eye images in real time and employing eye-tracking technology;
B, determining whether a duration the user's gaze point stays within a specified range about the current gaze coordinates exceeds a preset gaze threshold, if exceeds, analyzing the user's eye movement information using the eye-tracking technology; and
C, when the eye movement information denotes an open-eye state, then determining whether the duration the gaze point stays within the specified range about the current gaze coordinates exceeds a preset full-screen threshold, if exceeds, displaying in full screen the split screen where the current gaze coordinates are located.

The method may further comprise, after the step C:
D, when the eye movement information denotes a closed-eye state, then closing the split screen where the current gaze coordinates are located.

In the above method the step B may comprise specifically:
B1, determining whether the user's current eye gaze coordinates are located within a multi-screen region or a split-screen templates region in the display screen;
B2, if the current gaze coordinates are located within the multi-screen region, then further determining whether the duration the gaze point stays within the specified range about the current gaze coordinates exceeds the preset gaze threshold, if yes, analyzing the user's eye movement information using the eye-tracking technology; or B3, if the current gaze coordinates are located within the split-screen templates region, then further determining whether the duration the gaze point stays within a specified range about the current gaze coordinates exceeds the preset gaze threshold, if yes, entering a preset split-screen templates selecting and managing interface.

The step C may further comprise: after having entered the full-screen view, determining the user's current eye gaze coordinates on the display screen using the eye-tracking technology, if determining the user's current eye gaze coordinates are located within a specified area of the display screen and the duration the gaze point stays within a specified range about the current gaze coordinates exceeds the preset gaze threshold, exiting the full-screen view and restoring to the multi-screen mode.

The preset gaze threshold may lie in a range of 5-10 seconds.

The display screen of the mobile terminal may comprise 4 split screens under the multi-screen mode.

According to yet another aspect of the disclosure, an eye-tracking-based system of managing multi-screen view on a single display screen is further disclosed. The eye-tracking-based system may comprise:

a positioning module configured to, when a display screen of a mobile terminal is under the multi-screen mode, determine the user's current eye gaze coordinates on the display screen by capturing eye images in real time and using eye-tracking technology;

a determination and acquisition module configured to determine whether a duration the gaze point stays within a specified range about the current gaze coordinates exceeds a preset gaze threshold, and if exceeds, analyze the user's eye movement information using the eye-tracking technology; and a full-screen control module configured to, when the eye movement information denotes an open-eye state, determine whether the duration the gaze point stays within the specified range about the current gaze coordinates exceeds a preset full-screen threshold, and if exceeds, display in full screen the split screen where the current gaze coordinates are located.

The eye-tracking-based system may further comprise:

a split-screen-closing module configured to, when the eye movement information denotes a closed-eye state, close the split screen where the current gaze coordinates are located.

The determination and acquisition module may comprise specifically:

a region-determination unit configured to determine whether the user's current eye gaze coordinates are located within a multi-screen region or a split-screen templates region of the display screen;

a first control unit configured to, if the current gaze coordinates are located within the multi-screen region, further determine whether the duration the gaze point stays within the specified range about the current gaze coordinates exceeds the preset gaze threshold, and if exceeds, analyze the user's eye movement information using the eye-tracking technology; and a second control unit configured to, if the current gaze coordinates are located within the split-screen templates region of the display screen, further determine whether the duration the gaze point stays within a specified range about the current gaze coordinates exceeds the preset gaze threshold, and if exceeds, enter a preset split-screen templates selecting and managing interface.

The full-screen control module may be configured to, after having entered the full-screen view, further determine the user's current eye gaze coordinates on the display screen using the eye-tracking technology, and if determining the user's current eye gaze coordinates are located within a specified area of the display screen and the duration the gaze point stays within a specified range about the current gaze coordinates exceeds the preset gaze threshold, exit the full-screen view and restore to the multi-screen mode.

In the eye-tracking-based system, the preset gaze threshold may lie in a range of 5-10 seconds.

In the eye-tracking-based system, the display screen of the mobile terminal may comprise 4 split screens under the multi-screen mode.

Eye-tracking-based methods and systems of managing multi-screen view on a single display screen are disclosed as above. According to the eye-tracking-based method, when the display screen of a mobile terminal is under the multi-screen mode, the user's current eye gaze coordinates on the display screen can first be determined by capturing eye images in real time and employing eye-tracking technology, then a determination may be further made whether a duration the user's gaze point stays within a specified range about the current gaze coordinates exceeds a preset gaze threshold, if exceeds, the user's eye movement information can be analyzed using the eye-tracking technology; when the eye movement information denotes an open-eye state, a determination can be further made as to whether the duration the gaze point stays within the specified range about the current gaze coordinates exceeds a preset full-screen threshold, if yes, the split screen where the current gaze coordinates are located can be made full-screen. Thus, the eye-tracking technology can be employed to obtain the current gaze coordinates and the corresponding gaze duration and the eye movement information, determinations can then be made whether to make the current split screen full-screen or to exit the full-screen view, providing convenience to the user.

DETAILED DESCRIPTION OF THE DISCLOSURE

Eye-tracking-based methods and systems of managing multi-screen view on a single display screen are disclosed. To render the objectives, technical implementations and effects of the disclosure more definite and unambiguous, hereinafter the disclosure will be described in further detail. It, however, should be appreciated that the specific embodiments as discussed are merely meant to better illustrate, but not to limit, the present disclosure.

Figure 1:
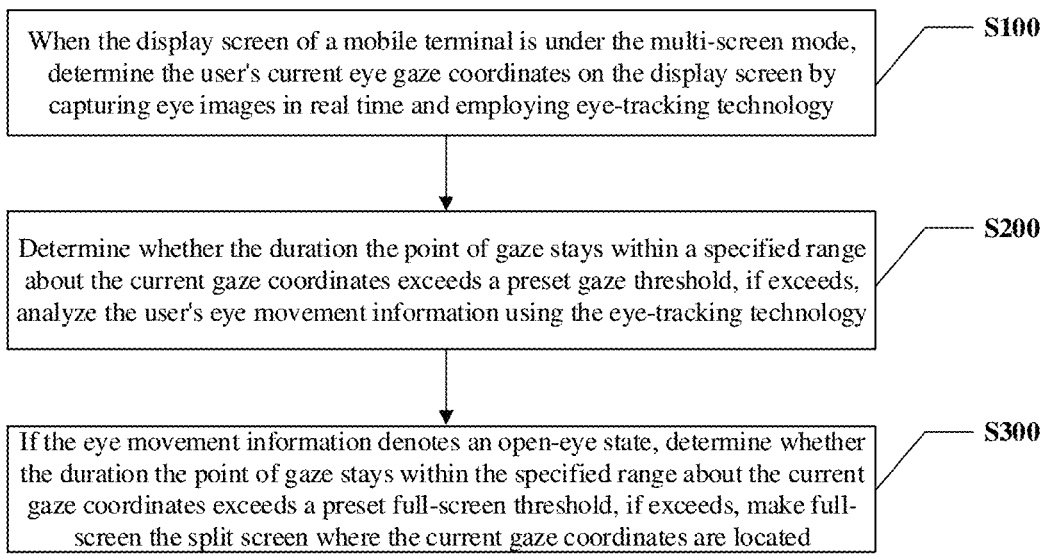
FIG. 1 is a flowchart illustrating an eye-tracking-based method of managing multi-screen view on a single display screen according to an exemplary embodiment of the disclosure.

FIG. 1 is a flowchart illustrating an eye-tracking-based method of managing multi-screen view on a single display screen according to an exemplary embodiment of the disclosure. The eye-tracking-based method may comprise the following steps.

In a first step S100, when a display screen of a mobile terminal is under the multi-screen mode, a determination can be made to obtain the user's current eye gaze coordinates on the display screen by capturing eye images in real time and employing eye-tracking technology.

When the user has opened multiple applications and displayed these applications in their respective split screens through split-screen technology, the front camera installed with the mobile terminal can be used to capture the user's eye images in real time, and the eye-tracking technology can be used to determine the user's current eye gaze coordinates on the display screen, that is, to determine the current position of the focal point of the user's line of sight on the display screen of the mobile terminal.

As mentioned earlier, eye-tracking is an emerging body-sensing technology developed in recent years, and it has been applied in a variety of mobile terminals. The eye-tracking technology can capture and track the user's eye state and change, and thus further analyze the screen position where the user is currently staring at. And in the current embodiment the current gaze coordinates are captured using the eye-tracking technology. Hence any eye-tracking device, regardless of its implementation manner and operation principle, so long as it can capture the user's current eye gaze coordinates by collecting the user's eye movement, shall be regarded as applicable to the solutions provided by the present disclosure and thus shall fall in the protection of the disclosure. The method can then proceed to step S200.

In the following step S200, a determination may be made whether a duration the user's gaze point stays within a specified range about the current gaze coordinates exceeds a preset gaze threshold, if exceeds, a determination may further be made to analyze the user's eye movement information using the eye-tracking technology.

Obviously, when detecting that the duration the user stares at one of multiple split screens of the mobile terminal exceeds the preset gaze threshold, it may indicate that the user wants to select this split screen for further operation. In practice, the preset gaze threshold can be set to 5-10 seconds. Namely, when detecting that the user has been staring at one of the multiple split screens of the mobile terminal for a continuous period of 5-10 seconds, it means that this split screen is of his interest and then will be selected, so the user needs not to touch the display screen to select the split screen, adding convenience for the user.

Having determined that the split screen is selected, the eye-tracking technology would be further used to analyze the user's eye movement information. The eye movement information may correspond to two states, one is an open-eye state, while the other is a closed-eye state. And the method can continue to step S300.

In the following step S300, if the eye movement information denotes the open-eye state, a determination may be made whether the duration the gaze point stays within the specified range about the current gaze coordinates exceeds a preset full-screen threshold, if yes, the split screen, where the current gaze coordinates are located, may be made full-screen.

Specifically, when the eye movement information denotes the open-eye state, it indicates that the user's gaze point still remains in this split screen, which may mean that the user wants to view further details contained in this split screen. In this case, to facilitate the user to view the details of the split screen, when determining that the gaze point stays within the specified range about the current gaze coordinates for a continuous time exceeding the preset full-screen threshold, the split screen can be maximized, while the applications displayed in other split screens may still run as usual in the background.

It can thus be further concluded that making the selected split screen full-screen can further free the user from touching the display screen to maximize the split screen, which further adds convenience for the user.

The method may further comprise the following steps after the step S300.

In the subsequent step S400, when the eye movement information denotes the closed-eye state, the split screen where the current gaze coordinates are located may be closed.

In step S200 a split screen can be selected by gazing one of the multiple split screens for a continuous time of 5-10 seconds, at this time the user can further close the split screen using the closed-eye state. Likewise, the arrangement of view of the display screen can be manipulated through the user's eye movement, eliminating the need for manual operations.

Figure 2:
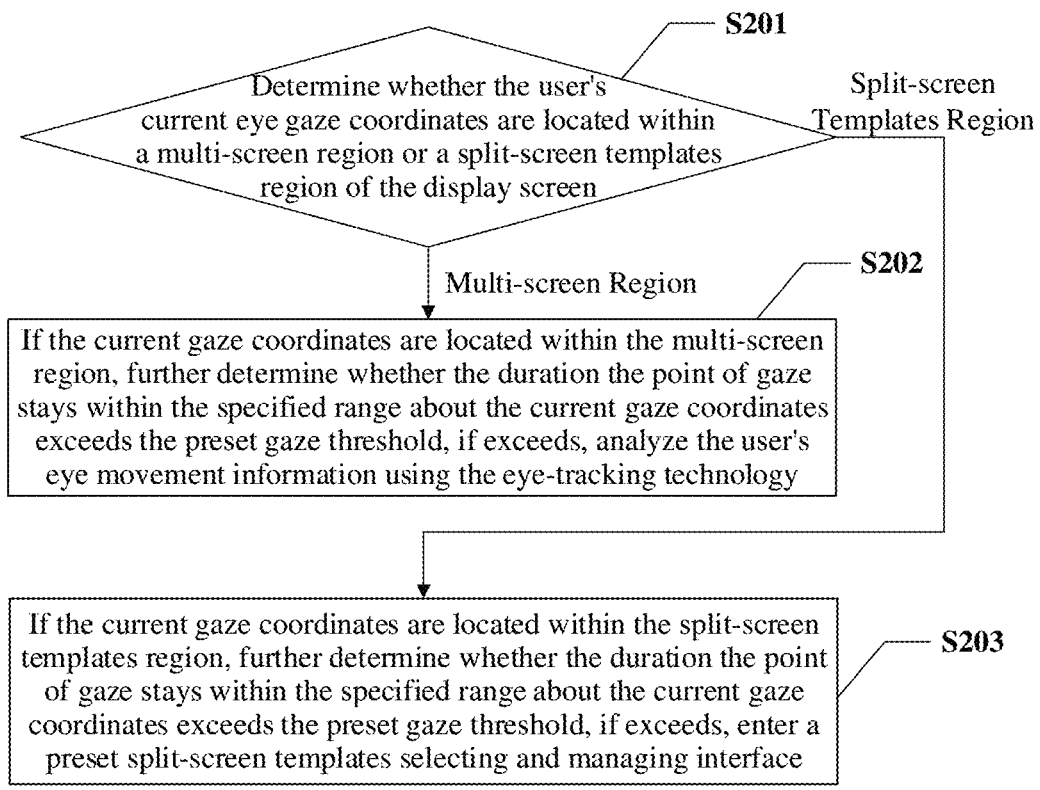
FIG. 2 is a flowchart illustrating the specific process of determining the region where the user's current eye gaze coordinates are located in the eye-tracking-based method of managing multi-screen view on a single display of the disclosure.

Referring now to FIG. 2, for the above-described step S200, the specific process of determining the region where the user's current eye gaze coordinates are located may comprise the following steps.

In step S201, a determination may be made whether the user's current eye gaze coordinates are located within a multi-screen region or a split-screen templates region of the display screen.

Since in the multi-screen mode of the mobile terminal the display range of each split screen may have been configured in advance, the specific split screen where the current gaze coordinates are located can be readily determined once having obtained the user's current eye gaze coordinates on the display screen. For a clearer understanding of the process of selecting a split screen through the user's gaze point, it will be further illustrated with reference to a specific embodiment.

Figure 3:
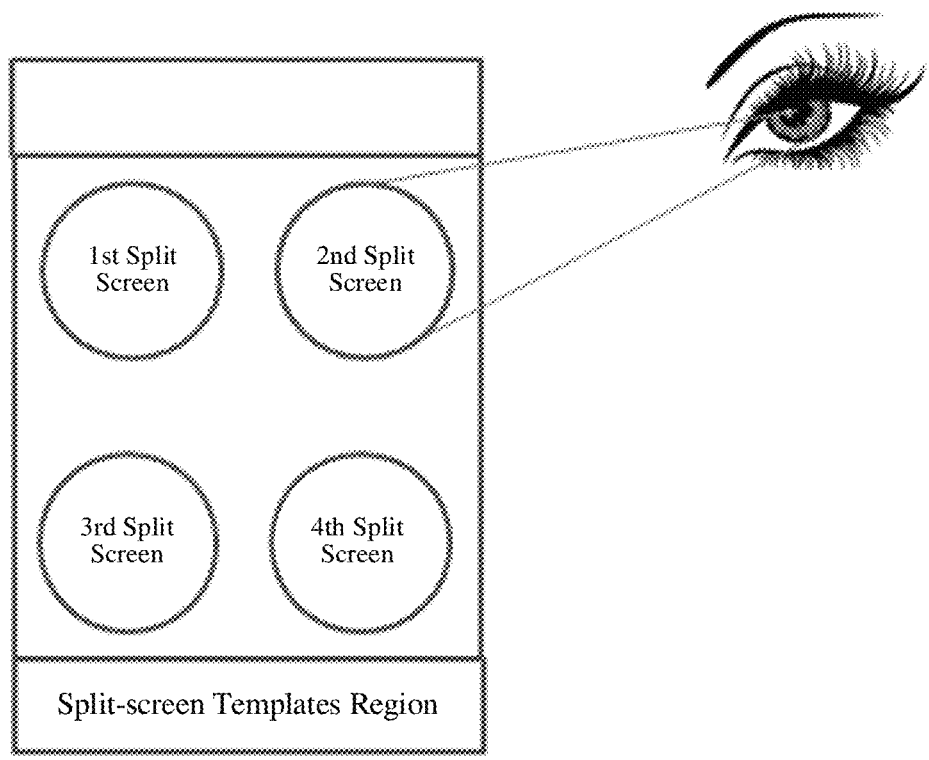
FIG. 3 is a schematic diagram illustrating the user selecting one among multiple split screens on a mobile terminal with the eye.

For example, referring now to FIG. 3, in which the display screen of the mobile terminal has entered the multi-screen mode and includes four split screens denoted as a first split screen, a second split screen, a third split screen, and a fourth split screen, respectively. The display screen may further comprise a split-screen templates region. Apparently in the scenario as shown in FIG. 3 the user's current eye gaze coordinates fall in the second split screen.

In the following steps S202, if the current gaze coordinates are located within the multi-screen region of the display screen, then a determination may further be made as to whether the gaze point stays within the specified range about the current gaze coordinates for a continuous interval over the preset gaze threshold. If yes, a further determination may be made to obtain the eye movement information using the eye-tracking technology.

When the user attempts to select by gaze one among multiple split screens in the multi-screen region, a determination can be made as to whether the focal point of the user's line of sight (i.e., the current gaze coordinates) still remain in the split screen, and if it does remain, then it may further be determined whether the dwell time exceeds a full-screen threshold (typically configured as 5-10 seconds), and if exceeds, the split screen may be selected. At this time, the eye-tracking technology may again be used to analyze the user's eye movement information.

In the following step S203, if the current gaze coordinates are located within the split-screen templates region of the display screen, a determination may be made whether the duration the gaze point stays within the specified range about the current gaze coordinates exceeds the preset gaze threshold. If exceeds, a preset split-screen templates selecting and managing interface may be entered.

After having entered the split-screen templates selecting and managing interface, the user can continue to use the method similar to that of selecting the split screen illustrated in the step S200, to select one among multiple pre-stored split-screen templates. Each split-screen template may comprise such information including the number of split screens, the split-screen arrangement, the coordinates range of each split screen in the whole display screen, etc.

The step S300 may further comprise: when having entered the full-screen view, determining the user's current eye gaze coordinates on the display screen using eye-tracking technology, if determining the user's current eye gaze coordinates are located within a specified area of the display screen and the duration the gaze point stays within a specified range about the current gaze coordinates exceeds the preset gaze threshold, exiting the full-screen view and restoring to the multi-screen mode.

After the split screen selected by the user has been made full-screen, if the user wants to exit the full-screen, then he may need to translate the current gaze coordinates to a specified area designated to the split screen currently made full-screen, for example, a square area in the upper left or upper right corner, etc. When the current gaze coordinates has been transferred to the specified area of the split screen and has stayed in a specified range over the preset gaze threshold (5-10 seconds), the full-screen view will be exited and restored to the multi-screen mode.

Thus, the eye-tracking technology can be used to obtain the current gaze coordinates and the corresponding gaze duration and the eye movement information, and further determinations can be made whether to display the currently selected split screen in full screen or to exit the full-screen view, providing convenience to the user.

Figure 4:
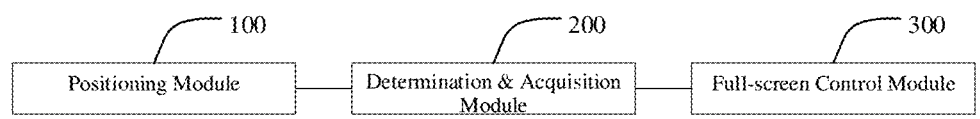
FIG. 4 is a block diagram of an eye-tracking-based system of managing multi-screen view on a single display screen according to an exemplary embodiment of the disclosure.

In accordance with the above method embodiment, an eye-tracking-based system of managing multi-screen view on a single display screen is further disclosed. Referring now to FIG. 4, the eye-tracking-based system may comprise:

a positioning module 100 configured to, when a display screen of a mobile terminal is under the multi-screen mode, determine the user's eye gaze coordinates on the display screen by capturing eye images in real time and employing eye-tracking technology; see the relevant description in the above method embodiment for more details.

a determination and acquisition module 200 configured to determine whether a duration the gaze point stays within a specified range about the current gaze coordinates exceeds a preset gaze threshold, and if exceeds, analyze the eye movement information using the eye-tracking technology; see the relevant description in the above method embodiment for more details.

a full-screen control module 300 configured to, when the eye movement information denotes an open-eye state, determine whether the duration the gaze point stays within the specified range about the current gaze coordinates exceeds a preset full-screen threshold, and if exceeds, display in full screen the split screen where the current gaze coordinates are located; see the relevant description in the above method embodiment for more details.

The eye-tracking-based system may further comprise:

a split-screen-closing module configured to, when the eye movement information denotes a closed-eye state, close the split screen where the current gaze coordinates are located; see the relevant description in the above method embodiment for more details.

The determination and acquisition module 200 may comprise specifically:

a region-determination unit configured to determine whether the user's current eye gaze coordinates are located within a multi-screen region or a split-screen templates region of the display screen; see the relevant description in the above method embodiment for more details.

a first control unit configured to, if the current gaze coordinates are located within the multi-screen region of the display screen, further determine whether the duration the gaze point stays within the specified range about the current gaze coordinates exceeds the preset gaze threshold, and if exceeds, analyze the eye movement information using the eye-tracking technology; see the relevant description in the above method embodiment for more details.

a second control unit configured to, if the current gaze coordinates are located within the split-screen templates region, further determine whether the duration the gaze point stays within the specified range about the current gaze coordinates exceeds the preset gaze threshold, and if exceeds, enter a preset split-screen templates selecting and managing interface; see the relevant description in the above method embodiment for more details.

The full-screen control module 300 may be configured to, after having entered the full-screen view, determine the user's current eye gaze coordinates on the display screen using eye-tracking technology, and if determining the user's current eye gaze coordinates are located within a specified area of the display screen and the duration the gaze point stays within a specified range about the current gaze coordinates exceeds the preset gaze threshold, exit the full-screen view and restore to the multi-screen mode; see the relevant description in the above method embodiment for more details.

In conclusion, aspects of the present disclosure provide an eye-tracking-based method and system of managing multi-screen view on a single display screen. According to the eye-tracking-based method, when the display screen of a mobile terminal is under the multi-screen mode, the user's current eye gaze coordinates on the display screen can first be determined by capturing eye images in real time and employing eye-tracking technology, then a determination may be further made whether a duration the gaze point stays within a specified range about the current gaze coordinates exceeds a preset gaze threshold, if exceeds, the user's eye movement information can be analyzed using the eye-tracking technology; when the eye movement information denotes an open-eye state, a determination can be further made whether the duration the gaze point stays within the specified range about the current gaze coordinates exceeds a preset full-screen threshold, if yes, the split screen where the current gaze coordinates are located can be displayed in full screen. Thus, the eye-tracking technology can be used to obtain the current gaze coordinates and the corresponding gaze duration and the eye movement information, then determinations can be made whether to make the current split screen full-screen or to exit the full-screen view, providing convenience to the user.

Furthermore, it is apparent to those skilled in the art that the present disclosure may also provide an eye-tracking-based system of managing multi-screen view on a single display screen, the system comprising a non-transitory program storage medium and a processor. The non-transitory program storage medium may store a program executed by the processor to perform the methods as described above. It is also apparent to those skilled in the art that, various units or modules 100, 200, and 300 as shown in FIG. 3 are software modules or software units. In another aspect, it is well-known that various software modules or software units inherently are stored in the non-transitory program storage medium and executed by the processor.

It, however, should be appreciated that the application of the present disclosure will not be limited to the examples raised above, and those of ordinary skill in the art can make various improvements or transformations based on the specification of the disclosure, all such improvements and transformations shall all fall in the protection range specified by the appended claims of the present disclosure.

The invention claimed is:

1. An eye-tracking-based method of managing multi-screen view on a display screen, comprising: determining current eye gaze coordinates of a user on the display screen by capturing eye images in real time and employing eye-tracking technology when the display screen is under a multi-screen mode, wherein a plurality of split screens are displayed on the display screen in the mufti-screen mode; determining whether a duration a gaze point of the user stays within a specified range about the current eye gaze coordinates exceeds a preset gaze threshold, and if exceeds, analyzing an open-eye state or a closed-eye state of the user using the eye- tracking technology; and after the step of determining whether a duration a gaze point of the user stays within a specified range about the current eye gaze coordinates exceeds a preset gaze threshold, and if exceeds, analyzing an open-eye state or a closed-eye state of the user using the eye-tracking technology, determining whether the duration the gaze point stays within the specified range about the current eye gaze coordinates exceeds a preset full-screen threshold when the user is in the open-eye state, and if exceeds, displaying on the display screen in a full-screen view, one split screen of the plurality of split screens where the current eye gaze coordinates are located; after determining whether the duration the gaze point stays within the specified range about the current eye gaze coordinates exceeds the preset full-screen threshold when the user is in the open-eye state, and after determining whether the user has transitioned into a closed-eye state, closing the split screen where the current eye gaze coordinates are located; wherein determining whether the duration the gaze point stays within the specified range about the current eye gaze coordinates exceeds the preset gaze threshold comprises: determining whether the current eye gaze coordinates are located within a multi screen region or a split-screen templates region of the display screen; determining further whether the duration the gaze point stays within the specified range about the current eye gaze coordinates exceeds the preset gaze threshold when the current eye gaze coordinates are located within the multi-screen region, and if exceeds, analyzing the open-eye state or the closed-eye state using the eye-tracking technology; and determining further whether the duration the gaze point stays within the specified range about the current eye gaze coordinates exceeds the preset gaze threshold when the current eye gaze coordinates are located within the split-screen templates region of the display screen when the user is in open-eye state, and if exceeds, entering a preset split-screen templates selecting and managing interface.

2. The eye-tracking-based method according to claim 1, wherein determining whether the duration the gaze point stays within the specified range about the current eye gaze coordinates exceeds the preset full-screen threshold when the user is in the open-eye state further comprises: determining the current eye gaze coordinates on the display screen using the eye-tracking technology after having entered the full-screen view, and if determining the current eye gaze coordinates are located within a specified area of the display screen and the duration the gaze point stays within a specified range about the current eye gaze coordinates exceeds the preset gaze threshold, exiting the full-screen view and restoring to the multi-screen mode.

3. The eye-tracking-based method according to claim 1, wherein the preset gaze threshold lies in a range of 5-10 seconds.

4. The eye-tracking-based method according to claim 1, wherein the display screen of the mobile terminal comprises 4 split screens under the multi-screen mode.

5. An eye-tracking-based system of managing multi-screen view on a display screen, comprising a processor, and a non-transitory program storage medium which comprises: a positioning module configured to, when the display screen is under a multi-screen mode, determine current eye gaze coordinates of a user on the display screen by capturing eye images in real time and employing eye-tracking technology; a determination and acquisition module configured to determine whether a duration a gaze point of the user stays within a specified range about the current eye gaze coordinates exceeds a preset gaze threshold, and if exceeds, analyze an open-eye state or a closed-eye state of the user using the eye-tracking technology; and a full-screen control module configured to, after haying determined whether a duration a gaze point of the user stays within a specified range about the current eye gaze coordinates exceeds a preset gaze threshold, and when the user is in the open-eye state, determine whether the duration the gaze point stays within a specified range about the current eye gaze coordinates exceeds a preset full-screen threshold, and if exceeds, display in a full-screen view, a split screen where the current eye gaze coordinates are located; and a split-screen-closing module configured to, after having determined whether a duration a gaze point of the user stays within a specified range about the current eve gaze coordinates exceeds a preset gaze threshold, and after determining whether the user has transitioned into a closed-eye state, close the split screen where the current eye gaze coordinates are located; wherein the determination and acquisition module comprises: a region-determination unit configured to determine whether the current eye gaze coordinates are located within a multi-screen region or a split-screen templates region of the display screen; a first control unit configured to, if the current eye gaze coordinates are located within the multi-screen region, determine further whether the duration the gaze point stays within the specified range about the current eye gaze coordinates exceeds the preset gaze threshold, and if exceeds, analyze the open-eye state or the closed-eye state using the eye-trucking technology; and a second control unit configured to, if the current eye gaze coordinates are located within the split-screen templates region, determine further whether the duration the gaze point stays within the specified range about the current eye gaze coordinates exceeds the preset gaze threshold when the user is in open-eye state, and if exceeds, enter a preset split-screen templates selecting and managing interface.

6. The eye-tracking-based system according to claim 5, wherein the full-screen control module is further configured to, after having entered the full-screen view, determine the current eye gaze coordinates on the display screen using the eye-tracking technology, and if determining the current eye gaze coordinates are located within a specified area of the display screen and the duration the gaze point stays within a specified range about the current eye gaze coordinates exceeds the preset gaze threshold, exit the full-screen view and restore to the multi-screen mode.

7. The eye-tracking-based system according to claim 5, wherein the preset gaze threshold has in a range of 5-10 seconds.

8. The eye-tracking-based system according to claim 5, wherein the display screen of the mobile terminal comprises 4 split screens under the multi-screen mode.

9. An eye-tracking-based method of managing multi-screen view on a display screen, comprising: determining current eye gaze coordinates of a user on the display screen by capturing eye images in real time and employing eye-tracking technology when the display screen is under a multi-screen mode, wherein a plurality of split screens are displayed on the display screen in the multi-screen mode; determining whether a duration a gaze point of the user stays within a specified range about the current eye gaze coordinates exceeds a preset gaze threshold; when the duration the gaze point of the user stays within the specified range about the current eye gaze coordinates exceeds the preset gaze threshold, analyzing an open-eye state or a closed-eye state of the user using the eye-tracking technology; determining whether the user has transitioned into a closed-eye state; closing one of the plurality of split screens where the current eye gaze coordinates are located; when the user is in the open-eye state, determining whether the duration the gaze point stays within the specified range about the current eye gaze coordinates exceeds a preset full-screen threshold; and when the duration the gaze point stays within the specified range about the current eye gaze coordinates exceeds the preset full-screen threshold, displaying on the display screen in a full-screen view, one split screen of the plurality of split screens where the current eye gaze coordinates are located.

10. The eye-tracking-based method according to claim 9, further comprising: after displaying on the display screen in a full-screen view, determining whether the current eye gaze coordinates are located within a specified area of the full-screen view and whether the duration the gaze point stays within the specified range about the current eye gaze coordinates exceeds the preset gaze threshold; when the current eye gaze coordinates are located within the specified area of the full-screen view and the duration the gaze point stays within the specified range about the current eye gaze coordinates exceeds the preset gaze threshold, exiting the full-screen view and restoring to the multi-screen mode.

11. The eye-tracking-based method according to claim 9, wherein the preset gaze threshold lies in a range of 5 seconds to 10 seconds.

12. The eye-tracking-based method according to claim 9, wherein the plurality of split screens comprises four split screens.

13. The eye-tracking-based method according to claim 9, wherein the determining whether the duration the gaze point stays within the specified range about the current eye gaze coordinates exceeds the preset gaze threshold comprises: determining whether the current eye gaze coordinates are located within a multi- screen region or a split-screen templates region of the display screen; determining further whether the duration the gaze point stays within the specified range about the current eye gaze coordinates exceeds the preset gaze threshold when the current eye gaze coordinates are located within the mufti-screen region, and if exceeds, analyzing the open-eye state or the closed-eye state using the eye-tracking technology; and determining further whether the duration the gaze point stays within the specified range about the current eye gaze coordinates exceeds the preset gaze threshold when the current eye gaze coordinates are located within the split-screen templates region of the display screen, and if exceeds, entering a preset split-screen templates selecting and managing interface.

14. The eye-tracking-based method according to claim 9, wherein a plurality of applications are displayed respectively in the plurality of split screens.

15. The eye-tracking-based method according to claim 14, wherein after determining whether the user has transitioned into a closed-eye state, closing one of the plurality of split screens where the current eye gaze coordinates are located, and further keeping the rest of the plurality of split screens being displayed.

16. The eye-tracking-based method according to claim 1, wherein a plurality of applications are displayed respectively in the plurality of split screens.

17. The eye-tracking-based method according to claim 16, wherein after determining whether the duration the gaze point stays within the specified range about the current eye gaze coordinates exceeds the preset full-screen threshold when the user is in the open-eye state, and after determining whether the user has transitioned into a closed-eye state, closing the split screen where the current eye gaze coordinates are located, and further keeping the rest of the plurality of split screens being displayed.

18. The eye-tracking-based system according to claim 5, wherein a plurality of applications are displayed respectively in the plurality of split screens.

19. The eye-tracking-based system according to claim 18, wherein the split-screen-closing module configured to, after having determined whether a duration a gaze point of the user stays within a specified range about the current eye gaze coordinates exceeds a preset gaze threshold, and after having determined whether the user has transitioned into a closed-eye state, close the split screen where the current eye gaze coordinates are located, and further keep the rest of the plurality of split screens being displayed.

* * * * *